Feb. 5, 1952 — R. H. COX — 2,584,425
IRRIGATION SIGNAL
Filed July 10, 1950
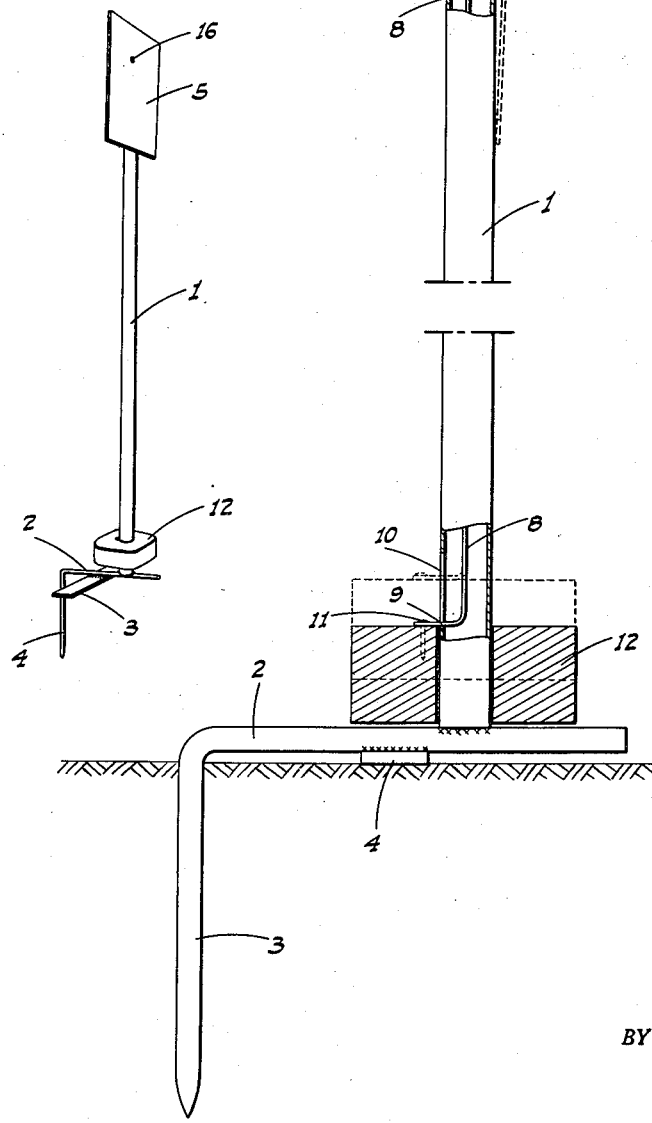
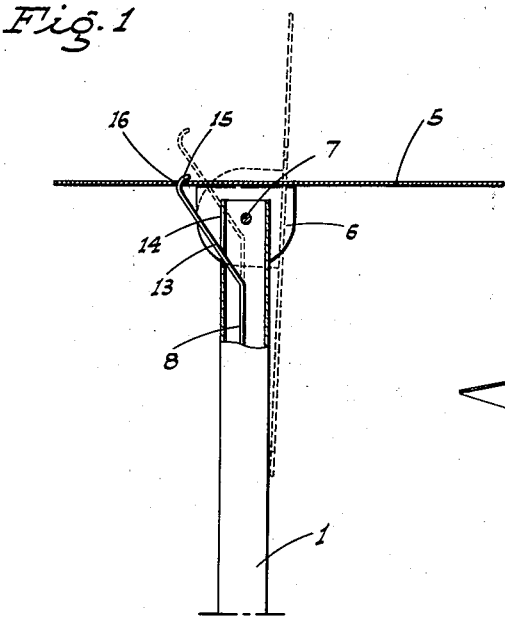
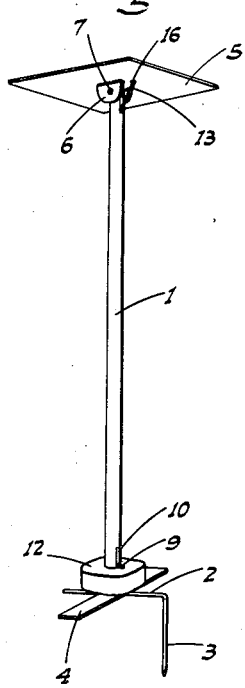
INVENTOR.
Robert H. Cox Patented Feb. 5, 1952

2,584,425

UNITED STATES PATENT OFFICE 2,584,425

IRRIGATION SIGNAL

Robert Hadley Cox, Modesto, Calif.

Application July 10, 1950, Serial No. 172,916

3 Claims. (Cl. 116—118)

1

The present invention relates in general to improvements in irrigation signals of the type adapted to be mounted in a field and responsive to rise in water level about the lower portion of the device; the purpose being to permit the irrigation tender to ascertain—from a remote point —when the irrigation water reaches the point at which the device is located.

A major object of this invention is to provide an irrigation signal which includes a novel signal plate assembly; the signal plate normally being latched in a horizontal, non-signal position and thus not readily visible from a distance. Also, this normal horizontal position is advantageous as wind resistance is thus reduced, and likelihood of the device being upset by the wind is minimized.

Another prime object of the invention is to provide an irrigation signal which includes a novel float controlled trigger mechanism to release the signal plate for gravitational movement to a vertical signal position.

An additional object of the invention is to provide an irrigation signal having a base assembly which effectively supports the device in upstanding position, even in relatively soft ground.

It is also an object of the invention to provide an irrigation signal which is designed for ease and economy of manufacture.

Still another object of the invention is to provide a practical and reliable irrigation signal, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, foreshortened and partly in section, of the irrigation signal.

Fig. 2 is a perspective view, on reduced scale, of the irrigation signal with the signal plate as latched in its initial or horizontal non-signal position.

Fig. 3 is a similar view, but shows the signal plate as released and in signal position.

Referring now more particularly to the characters of reference on the drawings, the novel irrigation signal comprises an elongated tubular post 1 fixed, at its lower end, to a horizontal base bar 2 intermediate the ends of the latter.

At one end the horizontal base bar 2 is formed with a down-turned ground peg 3, sharpened on its lower end in order to penetrate the ground with relative ease.

2

Adjacent the post 1, but in the direction of the ground peg 3, the horizontal base bar 2 is fitted with a transverse stabilizing foot 4.

To position the device the peg 3 is driven into the ground, which may be aided by placing the foot on the near, exposed portion of the horizontal base bar 2 and forcefully pressing downward until the peg 3 is substantially fully penetrated into the ground, and the transverse stabilizing foot 4 rests atop the ground, as clearly shown in Fig. 1.

With the above described base assembly the tubular post 1 is effectively maintained in a perpendicular position even though the ground may be relatively soft.

At its upper end the tubular post 1 is fitted with a relatively large-size, rectangular signal plate 5, pivoted to the post for gravitational swinging motion between a horizontal position, as in Figs. 1 and 2, to a vertical position, as in Fig. 3; the mounting arrangement including transversely spaced attachment ears 6 on the plate straddling the post and being pivoted thereto, as at 7.

The ears 6 are struck out of the signal plate 5 in somewhat offset relation toward one side thereof, whereby the plate tends to tip down at the other side, due to the weight differential.

The signal plate 5 is normally latched in its horizontal, non-signal position by the following float controlled trigger mechanism:

A control rod 8 extends in the tubular post 4, and adjacent but short of the lower end of the latter said rod includes an out-turned finger 9 which projects through a vertical slot 10 in the post.

Outwardly of the post the finger 9 is attached, as by a pin 11, to the top of a ring-like float 12 which surrounds the post at its lower end portion, normally being closely adjacent but not seated on the horizontal base bar 2.

At its upper end portion the control rod 8 diagonals, as at 13, out of the post 1 through a vertical slot 14, and at its upper end the diagonal part 13 of the rod is formed with an in-turned trigger hook 15 which engages the signal plate 5 through a hole 16 therein. The hole 16 is in the portion of the signal plate 5 which tends to swing upward when said plate swings by gravity to its vertical position.

The trigger hook 15 and the hole 16 are arranged so that when the ring-like float 12 is lowered and said trigger hook is engaged with the signal plate 5 through the hole 16, said plate is maintained in its horizontal, non-signal position.

The float is then suspended from the signal plate, the overhanging weight of the latter being counterbalanced by the weight of the float. Said float is then very close to the base bar 2, as shown in Fig. 1, so that the signal plate cannot possibly be pulled down appreciably below a horizontal position. However, upon some upward movement of the ring-like float 12, as for example to the dotted line position shown in Fig. 1, the signal plate 5 gravitationally escapes the trigger hook and swings to a vertical, signal position, as in said figure.

Such upward movement of the ring-like float occurs when the irrigation water reaches the point in the field or check where the device is located, and the resultant actuation of the device—i. e. swinging of the signal plate 5—gives warning to the irrigation tender wherever he may be, even at a remote point.

The signal plate 5 is preferably surfaced in white, or other eye-catching color, so as to enhance its visibility.

While the device is simple in its structure and economical to manufacture, it is nevertheless sturdy, not subject to ready damage, and is convenient to use.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. An irrigation signal comprising a post, a base assembly on the lower end of the post to support the same from the ground, a signal plate pivoted on the upper end of the post for gravitational swinging between a horizontal, non-signal position and a vertical, signal position, and the plate being pivoted in connection with the post in offset relation toward the edge of the plate which is uppermost when the latter is in vertical position, a control rod extending along the post, the top portion of the rod diagonaling out of the post upwardly and outwardly in the direction of said edge, a trigger hook on the upper end of the diagonal portion of the rod, a hole in the plate through which the trigger hook engages the plate to releasably latch the same in horizontal position, said hook being released upon upward motion of the rod, a ring-like float about the lower end of the post, and a connection between the float and rod.

2. An irrigation signal comprising a post, means to support the post from the ground in an upstanding position, a signal plate pivoted on the upper end of the post for gravitational swinging between a horizontal non-signaling position and a vertical signaling position, a float slidable on the post, and means between the float and plate to normally counteract and restrain the gravitational swinging of the plate, and including a releasable latch connection with the plate arranged to automatically release itself upon upward movement of the float from a predetermined low position.

3. An irrigation signal comprising an upstanding tubular post, a ground-supported base on the post, a signal plate, ears depending from the plate and straddling the post at the top, a transverse pivot between the ears and post positioned to swingably mount the plate for gravitational movement to one side of the post between a horizontal inoperative position and a vertical signaling position, a float slidable on the post adjacent the base, a rod in the post having an outturned finger on its lower end projecting through a vertical guide slot in the post, the finger at its outer end being rigidly connected to the float, an upwardly diagonaled upper end portion on the rod projecting from the other side of the post between the plate ears through another vertical guide slot in the post, and a hook on the upper end of the rod facing said other side of the post and insertible in releasable latching relation through a hole in the adjacent portion of the signal plate in releasable latching relation therewith when said plate is horizontal, the hook being formed to release itself upon upward movement of the rod and corresponding swinging of the plate a predetermined distance.

ROBERT HADLEY COX.

REFERENCES CITED

The following references are of record in the file of this patent:

UNITED STATES PATENTS

| Number | Name | Date |
| --- | --- | --- |
| 2,082,763 | Garrison | June 1, 1937 |

FOREIGN PATENTS

| Number | Country | Date |
| --- | --- | --- |
| 134,106 | Germany | Oct. 8, 1902 |